United States Patent
Liu et al.

(10) Patent No.: US 9,160,456 B2
(45) Date of Patent: Oct. 13, 2015

(54) DISPERSION MANAGEMENT FOR INHOMOGENEOUS FIBER-OPTIC LINKS

(71) Applicant: Alcatel-Lucent USA Inc., Murray Hill, NJ (US)

(72) Inventors: Xiang Liu, Marlboro, NJ (US); Chandrasekhar Sethumadhavan, Matawan, NJ (US); Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 112 days.

(21) Appl. No.: 14/032,352

(22) Filed: Sep. 20, 2013

(65) Prior Publication Data

US 2015/0086218 A1    Mar. 26, 2015

(51) Int. Cl.
| | | |
|---|---|---|
| *H04B 10/00* | (2013.01) | |
| *H04B 10/58* | (2013.01) | |
| *H04B 10/2513* | (2013.01) | |
| *H04B 10/50* | (2013.01) | |

(52) U.S. Cl.
CPC ............ *H04B 10/58* (2013.01); *H04B 10/2513* (2013.01); *H04B 10/50* (2013.01)

(58) Field of Classification Search
CPC .......................... H04B 2210/254; H04B 10/58
USPC ........................................................ 398/193
See application file for complete search history.

(56) References Cited

U.S. PATENT DOCUMENTS

| | | | | |
|---|---|---|---|---|
| 4,849,382 A | * | 7/1989 | Shibata et al. ................ 501/95.1 |
| 5,471,333 A | * | 11/1995 | Taga et al. ..................... 398/141 |
| 5,574,590 A | * | 11/1996 | Edagawa et al. ............. 398/178 |
| 5,629,795 A | * | 5/1997 | Suzuki et al. ................. 359/337 |
| 5,767,998 A | * | 6/1998 | Hasegawa et al. ............. 398/80 |
| 5,905,825 A | * | 5/1999 | Brindel et al. .................. 385/24 |
| 6,026,204 A | * | 2/2000 | Chbat ............................. 385/24 |
| 6,243,181 B1 | * | 6/2001 | Golovchenko et al. ....... 398/146 |

(Continued)

FOREIGN PATENT DOCUMENTS

| | | |
|---|---|---|
| EP | 2290853 A2 | 8/2010 |
| EP | 2434668 A1 | 3/2012 |

(Continued)

OTHER PUBLICATIONS

Singh, S. P., "Nonlinear Effects in Optical Fibers: Origin, Management and Applications," Progress in Electromagnetics Research, PIER 73, 2007, pp. 249-275.

(Continued)

*Primary Examiner* — Danny Leung
(74) *Attorney, Agent, or Firm* — Mendelsohn, Drucker & Dunleavy, P.C.; Yuri Gruzdkov

(57) ABSTRACT

Methods and apparatus for managing the effects of dispersion in an optical transport system in which some of the system's nodes are connected to one another via inhomogeneous fiber-optic links. In one embodiment, an optical transmitter is configured to apply electronic and/or optical dispersion pre-compensation in the amount selected to cause the peak-to-average-power ratio of the optical signal in the lower-dispersion portion of the link to be relatively low (e.g., close to a minimum value). Advantageously, such dispersion pre-compensation tends to significantly reduce, e.g., in terms of the bit-error rate, the directional anisotropy exhibited by optical transmissions through the inhomogeneous fiber-optic links.

28 Claims, 5 Drawing Sheets

(56) References Cited

U.S. PATENT DOCUMENTS

| | | | |
|---|---|---|---|
| 7,027,740 B2* | 4/2006 | Essiambre et al. | 398/147 |
| 7,333,729 B2* | 2/2008 | Minato et al. | 398/82 |
| 7,351,798 B2* | 4/2008 | Margolin et al. | 530/350 |
| 7,512,345 B2* | 3/2009 | Yamada | 398/147 |
| 7,577,369 B1* | 8/2009 | Barbarossa et al. | 398/200 |
| 7,693,425 B2* | 4/2010 | Vassilieva et al. | 398/147 |
| 8,204,377 B2* | 6/2012 | Liu et al. | 398/65 |
| 8,244,132 B2* | 8/2012 | Lin | 398/81 |
| 8,270,843 B2* | 9/2012 | Nakamoto | 398/159 |
| 8,351,798 B2 | 1/2013 | Edirisinghe et al. | |
| 8,654,439 B2* | 2/2014 | Qian et al. | 359/337 |
| 8,787,754 B1* | 7/2014 | Beckett et al. | 398/29 |
| 2002/0093706 A1* | 7/2002 | Lu et al. | 359/124 |
| 2002/0106148 A1* | 8/2002 | Schemmann et al. | 385/24 |
| 2004/0197103 A1 | 10/2004 | Roberts et al. | |
| 2008/0138090 A1* | 6/2008 | Gottwald | 398/193 |
| 2010/0247099 A1* | 9/2010 | Lowery et al. | 398/79 |
| 2010/0329695 A1 | 12/2010 | Sridhar | |

FOREIGN PATENT DOCUMENTS

| | | |
|---|---|---|
| WO | WO9413076 A1 | 6/1994 |
| WO | WO2009050465 A1 | 4/2009 |

OTHER PUBLICATIONS

Renaudier, J., et al., "Comparison of Set-Partitioned Two-Polarization 16QAM Formats with PDM-QPAK and PDM-8QAM for Optical Transmission Systems with Error-Correction Coding," ECOC Technical Digest, 2012 OSA (3 pages).

Wei, Xing, "Power-Weighted Dispersion Distribution Function for Characterizing Nonlinear Properties of Long-Haul Optical Transmission Links," Sep. 1, 2006, Optics Letters, vol. 31, No. 17, pp. 2544-2546.

U.S. Appl. No. 13/556,635, filed Jul. 24, 2012, entitled "Frequency Equalization for an Optical Transmitter".

U.S. Appl. No. 14/032,313, filed Sep. 20, 2013, entitled "Fiber-Nonlinearity Pre-Compensation Processing for an Optical Transmitter".

Wei, X., "Power-Weighted Dispersion Distribution Function for Characterizing Nonlinear Properties of Long-Haul Optical Transmission Links," Optics Letters, Optical Society of America, US, vol. 31, No. 17., Sep. 1, 2006, pp. 2544-2546.

International Search Report and the Written Opinion; Mailed Jan. 30, 2015 for the corresponding PCT Application No. PCT/US2014/055982.

* cited by examiner

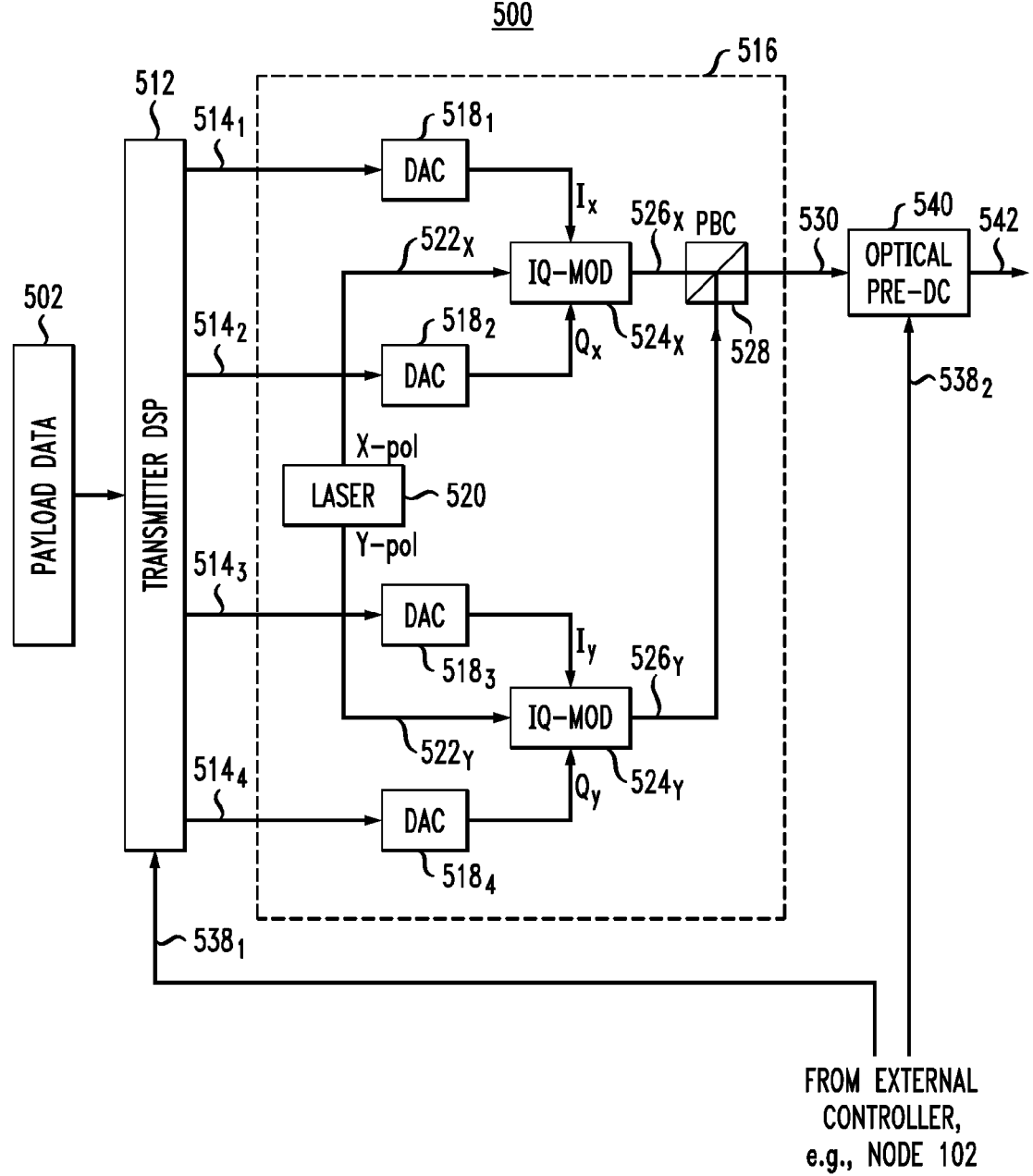

DISPERSION MANAGEMENT FOR INHOMOGENEOUS FIBER-OPTIC LINKS

BACKGROUND

1. Field

The present disclosure relates to optical communication equipment and, more specifically but not exclusively, to methods and apparatus for mitigating the adverse effects of dispersion in fiber-optic links.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The term "dispersion compensation" is often used to refer to a process of substantially canceling the chromatic dispersion introduced by an optical element or a combination of optical elements. In addition, the term "dispersion compensation" is used in a more general sense of dispersion management, e.g., in reference to the built-in capability to at least partially control the overall chromatic dispersion evolution in an optical transport system. The purposes of dispersion compensation include, but are not limited to reducing the effects of excessive temporal broadening of short optical pulses and mitigating detrimental nonlinear distortions of waveforms and/or signal envelopes.

Dispersion compensation is an important issue for fiber-optic links because optical signals modulated at relatively high bit rates can be subjected to strong dispersive broadening/distortion. For example, without dispersion compensation, each transmitted symbol might be broadened/distorted so much that it would strongly overlap with and/or detrimentally affect the neighboring symbols at the receiver, thereby causing significant inter-symbol interference. As known in the art, inter-symbol interference can disadvantageously cause a significant increase in the bit-error rate (BER).

SUMMARY OF SOME SPECIFIC EMBODIMENTS

Disclosed herein are methods and apparatus for managing the effects of chromatic dispersion in an optical transport system in which at least some of the system's nodes are connected to one another via inhomogeneous fiber-optic links. In one embodiment, an optical transmitter is configured to apply electronic and/or optical dispersion pre-compensation in the amount selected to cause the peak-to-average-power ratio (PAPR) of the optical signal in the lower-dispersion portion of the link to be relatively low (e.g., close to a minimum value). Advantageously, such dispersion pre-compensation tends to significantly reduce, e.g., in terms of the BER, the directional anisotropy exhibited by optical transmissions through the inhomogeneous fiber-optic links.

According to one embodiment, provided is a method of configuring an optical transmitter, the method comprising the steps of: (A) based on a location of an intended optical receiver, determining whether or not a fiber-optic link between the optical transmitter and the intended optical receiver is an inhomogeneous link; and (B) if the fiber-optic link is an inhomogeneous link, then: selecting an amount of dispersion pre-compensation based on dispersion characteristics of the fiber-optic link; and configuring the optical transmitter to apply said amount of dispersion pre-compensation before an optical transmission to the intended optical receiver.

According to another embodiment, provided is an apparatus comprising an optical transmitter configured to be optically coupled to an inhomogeneous fiber-optic link; and a controller configured to: select an amount of dispersion pre-compensation based on dispersion characteristics of the inhomogeneous fiber-optic link; and cause the optical transmitter to apply said amount of dispersion pre-compensation before an optical transmission over the inhomogeneous fiber-optic link.

BRIEF DESCRIPTION OF THE DRAWINGS

Other aspects, features, and benefits of various embodiments of the invention will become more fully apparent, by way of example, from the following detailed description and the accompanying drawings, in which:

FIG. 5 shows a block diagram of an optical transmitter that can be used in a node of the optical transport system shown in FIG. 1 according to an embodiment of the disclosure.

DETAILED DESCRIPTION

Some embodiments disclosed herein may benefit from the subject matter of U.S. Patent Application Publication No. 2015/0086193, which is incorporated herein by reference in its entirety.

Figure 1:
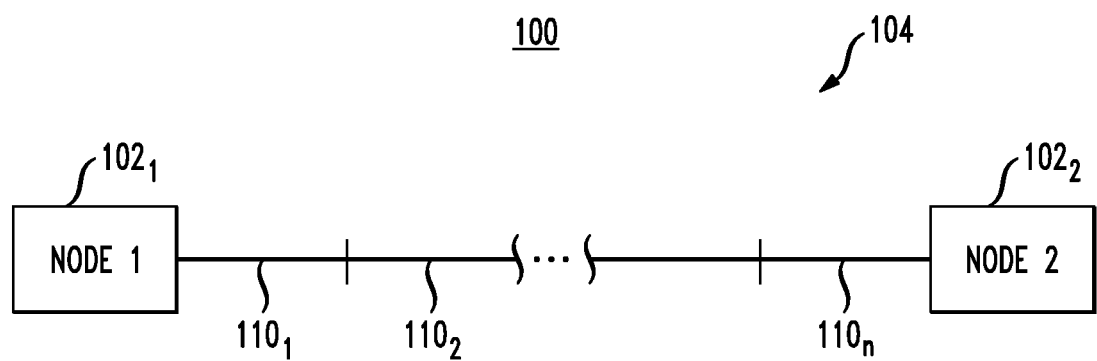
FIG. 1 shows a block diagram of an optical transport system according to an embodiment of the disclosure.

FIG. 1 shows a block diagram of an optical transport system 100 according to an embodiment of the disclosure. Optical transport system 100 is illustratively shown as having two nodes 102, labeled $102_1$ and $102_2$, optically coupled to one another via a fiber-optic link 104. Each of nodes $102_1$ and $102_2$ includes a respective optical transmitter and a respective optical receiver (not explicitly shown in FIG. 1). In an alternative embodiment, optical transport system 100 may have more than two nodes 102 coupled to each other via a fiber-optic network.

Fiber-optic link 104 includes a plurality of sections 110, labeled $110_1$-$110_n$. Some of sections $110_1$-$110_n$ may differ from others in their effective chromatic-dispersion characteristics, optical loss, and/or nonlinearity. Chromatic-dispersion characteristics of an optical fiber are conventionally expressed using the dispersion coefficient or the group-velocity dispersion parameter, D. The absolute value of D quantifies the temporal pulse spreading per unit bandwidth per unit distance traveled and is typically reported in the units of ps/(nm km). Usually, D is a function of wavelength, and the relevant values of D are the values at the wavelengths of interest, e.g., the carrier wavelength(s) of the modulated optical signal travelling through fiber-optic link 104.

We hereby define an effective dispersion coefficient, $D_{\textit{eff}}(z_1 \!=\!\!> \!z_2)$, for a given fiber section between coordinate $z_1$ and coordinate $z_2 \!>\! z_1$ as follows:

$$D_{\textit{eff}}(z_1 \!=\!\!> \!z_2) = \{\max[AD(z)] - \min[AD(z)]\}/(z_2 - z_1) \quad (1)$$

where z is the coordinate along the fiber length, wherein $z_1 \leq z \leq z_2$; and AD(z) is the function that describes the accumulated dispersion as a function of z between coordinates $z_1$ and $z_2$. Note that the effective dispersion coefficient, defined in this manner, is a generalization of the above-described conventional dispersion coefficient D that is applicable to both dispersion-uncompensated fiber sections and dispersion-compensated fiber sections. For example, for a homogeneous section of dispersion-uncompensated fiber, effective dispersion coefficient $D_{eff}$ and conventional dispersion coefficient D have the same value.

As used herein, the term "inhomogeneous fiber-optic link" refers to a fiber-optic link having at least two sections whose effective dispersion-coefficient values, at the wavelength(s) of interest, differ from one another by at least a factor (F) of 1.5, said factor F being calculated as the ratio of the higher of the two effective dispersion-coefficient values (in the nominator) to the lower of the two effective dispersion-coefficient values (in the denominator).

For example, an embodiment of fiber-optic link 104 is an inhomogeneous fiber-optic link when sections $110_1$-$110_{n-k}$ are made of a standard single-mode (SSM) fiber, and sections $110_{n-k+1}$-$110_n$ are made of a TrueWave® Reduced-Slope Low-Water-Peak (TW-RS-LWP) fiber, where 1<k<n. At 1550 nm, these fibers have the D values of about 17 ps/(nm km) and about 4.6 ps/(nm km), respectively, which results in the factor F of about 3.8. Dispersion profiles representing additional examples of inhomogeneous fiber-optic links are described below in reference to FIGS. 2A and 3A. From the provided description, one of ordinary skill in the art will understand how to practice the dispersion management techniques disclosed herein in various alternative inhomogeneous fiber-optic links, e.g., having alternative dispersion profiles or maps that differ from the illustrative examples described herein.

When fiber-optic link 104 is an inhomogeneous fiber-optic link, optical transport system 100 exhibits anisotropic optical-signal transport properties. For example, let us consider an example embodiment of fiber-optic link 104 having only two sections 110, wherein the section characterized by the higher D value is adjacent to node $102_1$, and the section characterized by the lower D value is adjacent to node $102_2$. Suppose now that the same optical signal is transmitted, through such fiber-optic link 104, from node $102_1$ to node $102_2$ and from node $102_2$ to node $102_1$. The result is that the optical receiver at node $102_2$ in the former transmission generally exhibits a higher BER than that of the optical receiver at node $102_1$ in the latter transmission. This anisotropic behavior may be disadvantageous, e.g., because links are usually deployed for bidirectional transport, and both directions are expected to work substantially error-free. The anisotropy of the link however forces the use of the technical means that have the capacity to meet this performance expectation for the poorer-performing direction, which capacity is unnecessarily excessive for the better-performing direction.

These and other pertinent problems illustrated by the above example can be addressed, according to an embodiment of the disclosure, e.g., by configuring the optical transmitter at node $102_1$ to apply electronic and/or optical dispersion pre-compensation (termed "pre-DC") prior to applying the corresponding modulated optical signal(s) to fiber-optic link 104. The amount of pre-DC applied by the optical transmitter at node $102_1$ is determined based on the specific characteristics of fiber-optic link 104, e.g., as further described below in reference to FIG. 4. In various embodiments, the optical transmitter at node $102_1$ can apply the determined amount of pre-DC using various suitable electronic and/or optical pre-DC techniques, such as one or more of those disclosed in U.S. Pat. Nos. 8,351,798, 8,244,132, 8,204,377, 7,693,425, 7,333,729, and 7,027,740, all of which are incorporated herein by reference in their entirety. In some embodiments, an optical receiver at node $102_1$ and/or node $102_2$ can additionally be configured to apply electronic and/or optical dispersion post-compensation, as known in the art.

Figure 2A:
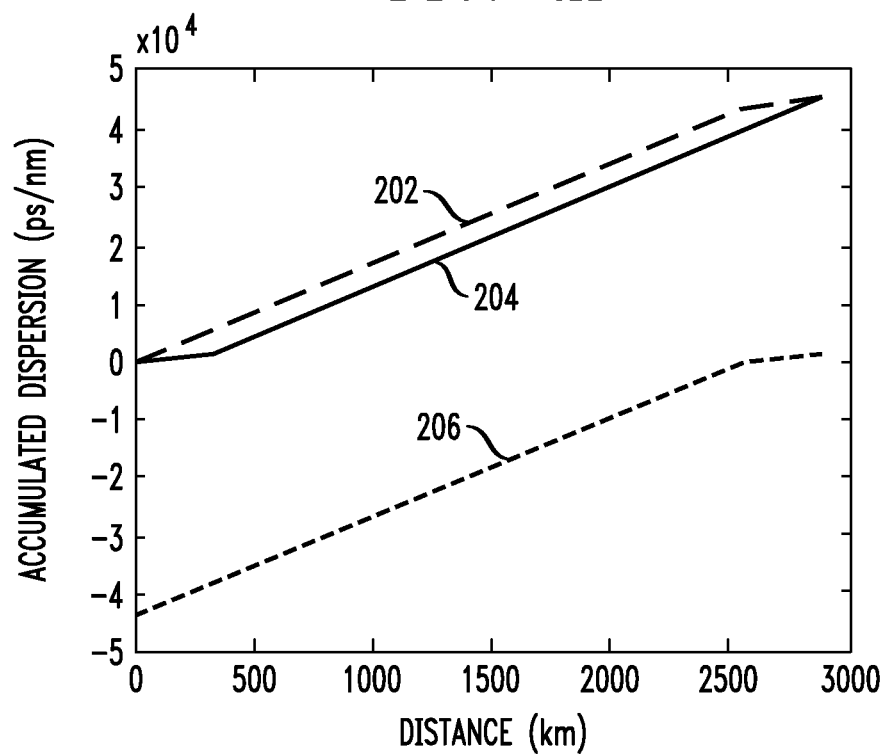
FIGS. 2A-2B graphically illustrate the performance of the optical transport system of FIG. 1 according to an embodiment of the disclosure.
Figure 2B:
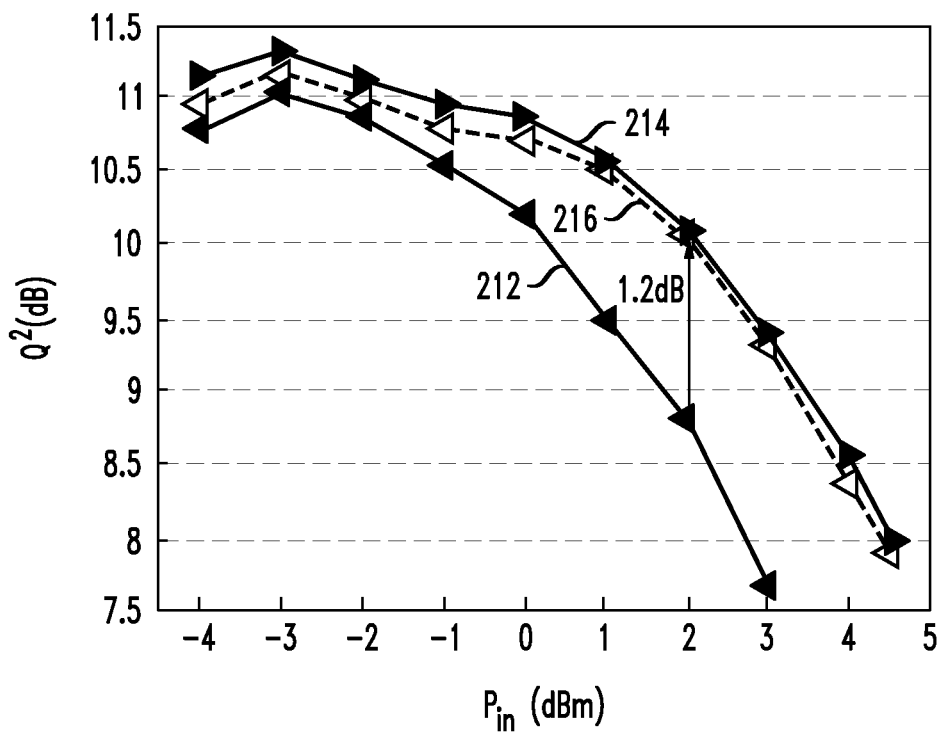

FIGS. 2A-2B graphically illustrate the performance of optical transport system 100 (FIG. 1) according to an embodiment of the disclosure. More specifically, FIG. 2A graphically shows the accumulated dispersion as a function of the distance traveled by the optical signal along fiber-optic link 104. FIG. 2B graphically shows the $Q^2$-factor exhibited by the optical receiver as a function of the remote input power of the optical signal. For the data shown in FIG. 2B, the $Q^2$-factor was derived, as known in the art, from the receiver's BER.

Referring to FIG. 2A, curves 202 and 204 represent the dispersion profile or dispersion map of fiber-optic link 104. In this particular embodiment, fiber-optic link 104 comprises (i) thirty-two sections $110_1$-$110_{32}$ of SSM fiber, with each section being 80 km long, and (ii) four sections $110_{33}$-$110_{36}$ of TW-RS-LWP fiber, with each section also being 80 km long. Thus, in this particular embodiment n=36 (see FIG. 1). Curve 202 represents the dispersion map of fiber-optic link 104 in the direction from node $102_1$ to node $102_2$. Curve 204 similarly represents the dispersion map of fiber-optic link 104 in the direction from node $102_2$ to node $102_1$. The kink in each of curves 202 and 204 corresponds to the junction between sections $110_{32}$ and $110_{33}$.

A curve 206, also shown in FIG. 2A, represents the effective dispersion map of fiber-optic link 104 in the direction from node $102_1$ to node $102_2$ when the optical transmitter in node $102_1$ is configured to apply pre-DC in the amount of −44264 ps/nm. Note that the absolute amount of pre-DC applied by the transmitter differs significantly both from the cumulative dispersion (~43520 ps/nm) in the high-D sections $110_1$-$110_{32}$ and from the total dispersion (~44990 ps/nm) in the entire link, i.e., in sections $110_1$-$110_{36}$. This amount of pre-DC has been determined using method 400 (FIG. 4), and it approximates an optimum amount of pre-DC for this particular embodiment of fiber-optic link 104.

Referring to FIG. 2B, curves 212 and 214 graphically illustrate the transmission performance over fiber-optic link 104 without pre-DC. More specifically, curve 212 corresponds to the dispersion map represented by curve 202 (FIG. 2A), and curve 214 corresponds to the dispersion map represented by curve 204 (FIG. 2A). The difference between curves 212 and 214 clearly shows the above-mentioned anisotropic behavior of fiber-optic link 104 owing to the fact that the link is an inhomogeneous fiber-optic link.

A curve 216, also shown in FIG. 2B, graphically illustrates the transmission performance over fiber-optic link 104 with pre-DC in the amount of −44264 ps/nm. As such, curve 216 corresponds to the effective dispersion map represented by curve 206 (FIG. 2A). As evident form the data of FIG. 2B, the applied pre-DC transforms curve 212 into curve 216, thereby improving the transmission performance over fiber-optic link 104 in the direction from node $102_1$ to node $102_2$ and substantially removing the link's anisotropy. For example, at the input power of about 2 dBm, the applied pre-DC causes an improvement in the $Q^2$-factor of about 1.2 dB, as indicated by the arrow in FIG. 2B.

Figure 3A:
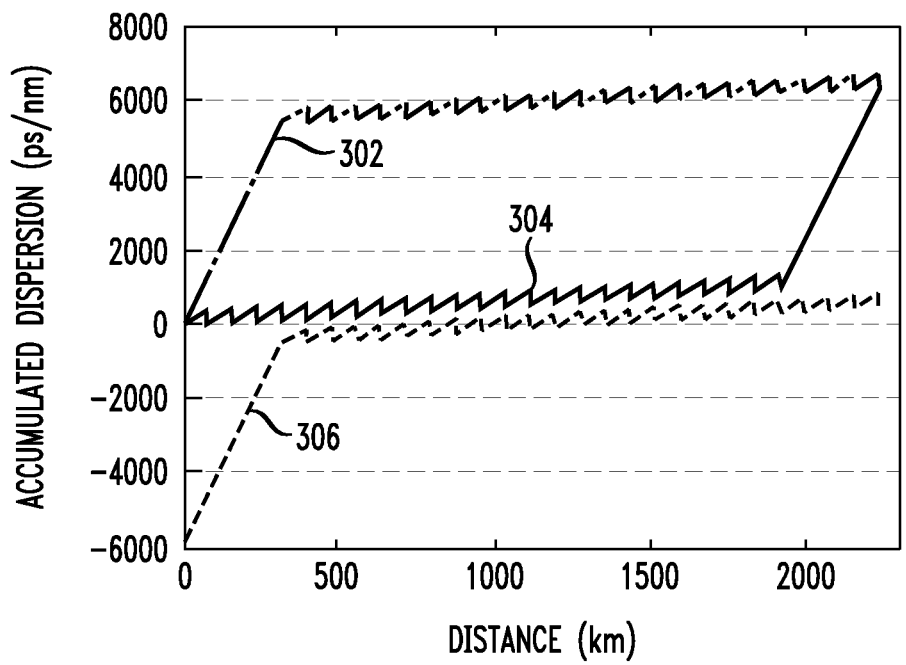
FIGS. 3A-3B graphically illustrate the performance of the optical transport system of FIG. 1 according to an alternative embodiment of the disclosure.
Figure 3B:
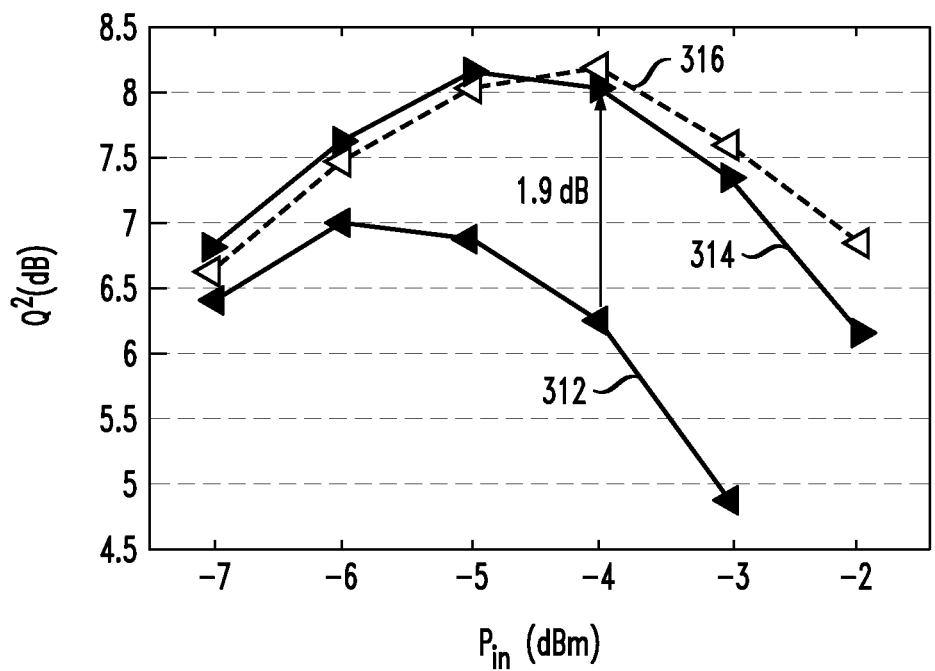

FIGS. 3A-3B graphically illustrate the performance of optical transport system 100 (FIG. 1) according to an alternative embodiment of the disclosure. More specifically, FIG. 3A graphically shows the accumulated dispersion as a function of the distance traveled by the optical signal along fiber-optic link 104. FIG. 3B graphically shows the $Q^2$-factor exhibited by the optical receiver as a function of the remote input power of the optical signal. For the data shown in FIG. 3B, the $Q^2$-factor was derived, as known in the art, from the receiver's BER.

Referring to FIG. 3A, curves 302 and 304 represent the dispersion profile or map of fiber-optic link 104. In this particular embodiment, fiber-optic link 104 comprises (i) four sections $110_1$-$110_4$ of SSM fiber, with each section being 80 km long, and (ii) twenty-four sections $110_5$-$110_{28}$ of dispersion-managed TW-RS-LWP fiber, with each section similarly being 80 km long. Thus, in this particular embodiment n=28 (see FIG. 1).

Each of the dispersion-managed sections $110_5$-$110_{28}$ comprises a relatively long span of TW-RS-LWP fiber connected to a relatively short span of dispersion compensating fiber. Due to the use of these two fiber types, each of sections $110_5$-$110_{28}$ has a residual dispersion of only about 40 ps/nm, which corresponds to the effective D value of about 0.5 ps/(nm km). Thus, in this particular embodiment, the effective factor F for fiber-optic link 104 is about 34.

Curve 302 represents the dispersion map of fiber-optic link 104 in the direction from node $102_1$ to node $102_2$. Curve 304 similarly represents the dispersion map of fiber-optic link 104 in the direction from node $102_2$ to node $102_1$. The saw-tooth-like portion in each of curves 302 and 304 corresponds to dispersion-managed sections $110_5$-$110_{28}$, with the steeper edge of each saw tooth corresponding to the typically lumped at the end dispersion compensating fiber in the respective section, and the shallower edge of the saw tooth corresponding to the span of TW-RS-LWP fiber in that section. In some embodiments, the dispersion compensating fiber may be deployed at the optical-amplification sites that link two adjacent fiber spans to one another.

A curve 306, also shown in FIG. 3A, represents the effective dispersion map of fiber-optic link 104 in the direction from node $102_1$ to node $102_2$ when the optical transmitter in node $102_1$ is configured to apply pre-DC in the amount of −5920 ps/nm. Note that the absolute amount of pre-DC applied by the transmitter differs significantly both from the cumulative dispersion (~5440 ps/nm) in sections $110_1$-$110_4$ and from the total dispersion (~6400 ps/nm) in the entire link, i.e., in sections $110_1$-$110_{28}$. This amount of pre-DC has been determined using method 400 (FIG. 4), and it approximates an optimum amount of pre-DC for this particular embodiment of fiber-optic link 104.

Referring to FIG. 3B, curves 312 and 314 graphically illustrate the transmission performance over fiber-optic link 104 without pre-DC. More specifically, curve 312 corresponds to the dispersion map represented by curve 302 (FIG. 3A), and curve 314 corresponds to the dispersion map represented by curve 304 (FIG. 3A). The difference between curves 312 and 314 clearly shows the above-mentioned anisotropic behavior of fiber-optic link 104 owing to the fact that the link is an inhomogeneous fiber-optic link.

A curve 316, also shown in FIG. 3B, graphically illustrates the transmission performance over fiber-optic link 104 with pre-DC in the amount of −5920 ps/nm. As such, curve 316 corresponds to the effective dispersion map represented by curve 306 (FIG. 3A). As evident form the data of FIG. 3B, the applied pre-DC transforms curve 312 into curve 316, thereby improving the transmission performance over fiber-optic link 104 in the direction from node $102_1$ to node $102_2$ and substantially removing the link's anisotropy. For example, at the input power of about −4 dBm, the applied pre-DC causes an improvement in the $Q^2$-factor of about 1.9 dB, as indicated by the arrow in FIG. 3B.

Figure 4:
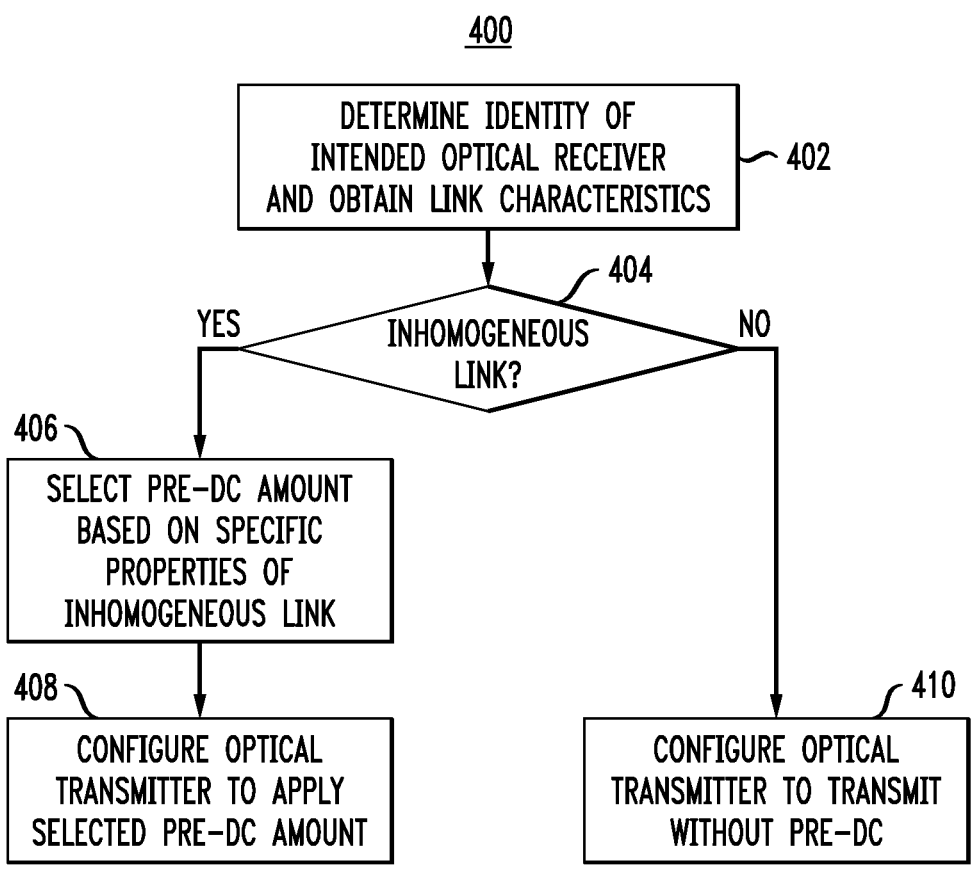
FIG. 4 shows a flowchart of a method of configuring an optical transmitter for dispersion pre-compensation that can be used in the optical transport system of FIG. 1 according to an embodiment of the disclosure.

FIG. 4 shows a flowchart of a method 400 of configuring an optical transmitter for pre-DC that can be used in optical transport system 100 (FIG. 1) according to an embodiment of the disclosure. In the above-presented examples, method 400 is particularly beneficial for configuring the optical transmitter located at node $102_1$. In various embodiments, method 400 can be used to configure any optical transmitter, e.g., an optical transmitter facing an inhomogeneous fiber-optic link, wherein a portion of the link having a relatively high effective D value precedes a portion of the link having a relatively low effective D value.

Method 400 begins at step 402, during which a computation entity (not explicitly shown in FIG. 1), located either in the transmit network node (e.g., a node 102, FIG. 1) or at one or more remote locations, receives information about the physical characteristics of the end-to-end optical link that connects the implicated optical transmitter and the intended optical receiver. This information may be retrieved from a link-parameter repository configured to store therein the optical link parameters for the various links in the network or obtained locally, e.g., through automated link-characterization measurements.

At step 404, based on the information received at step 402, the computation entity further determines whether or not the fiber-optic link between the optical transmitter and the intended optical receiver is an inhomogeneous link. As indicated above, a fiber-optic link can be regarded as an "inhomogeneous fiber-optic link" if it has at least two sections whose absolute values of D (or $D_{eff}$), at the wavelength(s) of interest, differ from one another by at least a factor (F) of 1.5. This determination can be made, e.g., by inspecting an appropriate part of the network's dispersion map (e.g., 202, 204, 302, 304; see FIGS. 2A and 3A), where dispersion properties of the various spans of fiber deployed in the link in question are specified. If the result of this determination is in the affirmative, then the processing of method 400 is directed to step 406. Otherwise, the processing of method 400 is directed to step 410.

At step 406, the computation entity selects the amount of pre-DC that will be applied by the optical transmitter during the transmission in question, with said selection being based on the specific properties of the inhomogeneous link.

In one embodiment, the selected amount of pre-DC is intended to approximately minimize (e.g., to within ca. 20% of the achievable minimum) the average peak-to-average-power ratio (PAPR) in a portion of the link having a relatively low effective D value. For example, for an embodiment of fiber-optic link 104 having a dispersion map similar to that represented by curve 202 (FIG. 2A), the amount of pre-DC is selected such as to minimize the average PAPR taken over sections $110_{33}$-$110_{36}$ in the forward direction (resulting in considerable pre-DC and the down-shifted dispersion map 206). In the backward direction, minimization of the average PAPR taken over sections $110_{33}$-$110_{36}$ requires a relatively small amount of pre-DC. For the sake of clarity, the resulting (only slightly) downshifted version of curve 204 is omitted in FIG. 2A.

As another example, for an embodiment of fiber-optic link 104 having a dispersion map similar to that represented by curve 302 (FIG. 3A), the amount of pre-DC is selected such as to minimize the average PAPR taken over sections $110_5$-$110_{28}$, resulting in the significantly down-shifted dispersion curve 306 for the forward direction. For the backward direction, the amount of pre-DC required to minimize the average PAPR taken over sections $110_5$-$110_{28}$ is again relatively small (approximately −500 ps/nm). For the sake of clarity, the resulting only slightly downshifted version of curve 304 is omitted in FIG. 3A. Oftentimes, the absolute value of the amount of pre-DC selected in this manner falls between the cumulative dispersion imposed by the portion of the link having the relatively high effective D and the total dispersion over the entire link. This particular pre-DC strategy can be viewed as being based on an understanding that a high dispersion-induced PAPR of the optical signal is more detrimental in a low-dispersion fiber or section (where nonlinear effects are more severe) than in a high-dispersion fiber or section.

Depending on the specific characteristics of the dispersion map corresponding to the inhomogeneous link and the type of modulation used at the optical transmitter, the process of selecting the amount of pre-DC used at step 406 can be modified using one or more of the following approaches.

In some embodiments, the same amount of pre-DC may be applied to different frequency (wavelength) components of a super-channel despite the different respective amounts of dispersion experienced in the link by the individual frequency components of the super-channel. A potential benefit of this approach is that both intra-channel and inter-channel nonlinear impairments can be reduced because the PAPRs of the optical signals are simultaneously reduced when traveling together in the low-dispersion fiber.

In some embodiments, the inhomogeneous link may contain at least two different (in terms of the D values and/or fiber type) low-dispersion fiber sections. In this case, the selected amount of pre-DC also takes into account one or both of (i) the optical losses (or optical signal-to-noise ratio, OSNR) in those low-D fiber sections and (ii) the effective nonlinear phase shift experienced by the optical signal in a given dispersion-tolerance window. Typically, pre-DC is applied in a manner that causes the average PAPR to be approximately minimized in the low-D fiber section that causes the larger OSNR degradation or has the higher effective nonlinear phase shift.

In some embodiments, the optical transmitter may also be configured to perform electronic nonlinearity pre-compensation together with (e.g., immediately after) the electronic pre-DC.

In some embodiments, the intended optical receiver may be configured to perform electronic nonlinearity post-compensation when a low-dispersion fiber section of the inhomogeneous link is relatively close to that optical receiver.

In some embodiments, the pre-DC amounts for the various inhomogeneous links in the network can be computed prior to the node's deployment and then loaded into the node, e.g., in the form of a look-up table (LUT). Then, in operation, the node can execute step 406 by reading an appropriate pre-DC value from the LUT.

At step 408, the optical transmitter is configured to apply the amount of pre-DC selected at step 406 during the corresponding optical transmission.

At step 410, the optical transmitter is configured to transmit the corresponding optical signals without applying pre-DC.

FIG. 5 shows a block diagram of an optical transmitter 500 that can be used in a node 102 (FIG. 1) according to an embodiment of the disclosure. Optical transmitter 500 is configured to (i) modulate light using constellation symbols and (ii) apply a resulting modulated optical output signal 542 to a fiber-optic link, such as fiber-optic link 104 (FIG. 1), for transmission to a remote optical receiver, e.g., located at another node 102 (FIG. 1). Both optical transmitter 500 and the remote optical receiver rely on the same selected constellation (such as a quadrature-amplitude-modulation (QAM) constellation or a quadrature-phase-shift-keying (QPSK) constellation) in the processes of generating signal 542 and decoding the corresponding received optical signal, respectively.

Optical transmitter 500 receives a digital (electrical) input stream 502 of payload data and applies it to a digital signal processor (DSP) 512. DSP 512 processes input stream 502 to generate electrical digital signals $514_1$-$514_4$. Such processing may include, but is not limited to forward-error-correction (FEC) encoding, constellation mapping, digital frequency equalization, and electronic dispersion pre-compensation. In each signaling interval (also referred to as a symbol period or a time slot corresponding to an optical symbol), signals $514_1$ and $514_2$ carry digital values that represent the in-phase (I) component and quadrature (Q) component, respectively, of a corresponding complex optical waveform intended for transmission using X-polarized light. Signals $514_3$ and $514_4$ similarly carry digital values that represent the I and Q components, respectively, of the corresponding complex optical waveform intended for transmission using Y-polarized light, where the Y-polarization is approximately orthogonal to the X-polarization.

An electrical-to-optical (E/O) converter (also sometimes referred to as a front-end circuit) 516 of optical transmitter 500 transforms digital signals $514_1$-$514_4$ into a modulated optical signal 530. More specifically, digital-to-analog converters (DACs) $518_1$ and $518_2$ transform digital signals $514_1$ and $514_2$ into an analog form to generate drive signals $I_X$ and $Q_X$, respectively. Drive signals $I_X$ and $Q_X$ are then used, in a conventional manner, to drive an I-Q modulator $524_X$. Based on drive signals $I_X$ and $Q_X$, I-Q modulator $524_X$ modulates an X-polarized beam $522_X$ of light supplied by a laser source 520, thereby generating an X-polarized modulated optical signal $526_X$.

DACs $518_3$ and $518_4$ similarly transform digital signals $514_3$ and $514_4$ into an analog form to generate drive signals $I_Y$ and $Q_Y$, respectively. Based on drive signals $I_Y$ and $Q_Y$, an I-Q modulator $524_Y$ modulates a Y-polarized beam $522_Y$ of light supplied by laser source 520, thereby generating a Y-polarized modulated optical signal $526_Y$.

A polarization beam combiner 528 combines modulated optical signals $526_X$ and $526_Y$ to generate modulated optical signal 530.

An optical dispersion pre-compensator 540 applies optical dispersion pre-compensation to modulated optical signal 530, thereby generating optical output signal 542.

The total amount of pre-DC applied by optical transmitter 500 includes the electronic pre-DC applied by DSP 512 and the optical pre-DC applied by optical dispersion pre-compensator 540. The total amount of pre-DC can be determined, e.g., using method 400 (FIG. 4) and then partitioned between DSP 512 and optical dispersion pre-compensator 540 in any desirable manner. The respective sub-amounts can be communicated to DSP 512 and optical dispersion pre-compensator 540 via control signals $538_1$ and $538_2$ generated, e.g., by a corresponding controller located in the host node 102 (FIG. 1).

In some embodiments, optical dispersion pre-compensator 540 can be omitted, in which case DSP 512 is configured to apply the total amount of pre-DC in the electrical domain.

In some embodiments, DSP 512 can be configured not to apply any pre-DC at all, in which case optical dispersion pre-compensator 540 is configured to apply the total amount of pre-DC in the optical domain.

According to an embodiment disclosed above in reference to FIGS. 1-5, provided is a method (e.g., 400; FIG. 4) of configuring an optical transmitter (e.g., 500; FIG. 5). The method comprises: based on a location of an intended optical receiver, determining (e.g., using steps 402, 404; FIG. 4) whether or not a fiber-optic link (e.g., 104; FIG. 1) between the optical transmitter and the intended optical receiver is an inhomogeneous link; and if the fiber-optic link is an inhomogeneous link, then: selecting (e.g., using step 406; FIG. 4) an amount of dispersion pre-compensation based on dispersion characteristics of the fiber-optic link; and configuring the optical transmitter (e.g., using step 408; FIG. 4) to apply said amount of dispersion pre-compensation during an optical transmission to the intended optical receiver.

In some embodiments of the above method, the method further comprises: if the fiber-optic link is not an inhomogeneous link, then configuring the optical transmitter (e.g., using step 410; FIG. 4) to perform an optical transmission to the intended optical receiver without dispersion pre-compensation.

In some embodiments of any of the above methods, the method further comprises: if the fiber-optic link is an inhomogeneous link, then further determining whether or not the fiber-optic link has a first portion (e.g., $110_1$-$110_{n-k}$; FIG. 1) and a second portion (e.g., $110_{n-k+1}$-$110_n$; FIG. 1), wherein: the first portion is characterized by a first effective dispersion-coefficient value; the second portion is characterized by a second effective dispersion-coefficient value that is smaller than the first effective dispersion-coefficient value; and the first portion is closer to the optical transmitter than the second portion (e.g., as in 202, FIG. 2A, or 302, FIG. 3A).

In some embodiments of any of the above methods, the method further comprises: if the fiber-optic link does not have said first and second portions, then configuring the optical transmitter (e.g., using step 410; FIG. 4) to perform an optical transmission to the intended optical receiver without dispersion pre-compensation.

In some embodiments of any of the above methods, the first effective dispersion-coefficient value is greater than the second effective dispersion-coefficient value by a factor of at least about 3, wherein the term "about 3" should be interpreted to mean a value between 2.7 and 3.3.

In some embodiments of any of the above methods, the first effective dispersion-coefficient value is greater than the second effective dispersion-coefficient value by a factor of at least about 10, wherein the term "about 10" should be interpreted to mean a value between 9.0 and 11.0.

In some embodiments of any of the above methods, if the fiber-optic link has said first and second portions, then the step of selecting comprises selecting the amount of dispersion pre-compensation such as to approximately minimize an average PAPR in the second portion.

In some embodiments of any of the above methods, if the fiber-optic link has said first and second portions, then the step of selecting comprises selecting an absolute value of the amount of dispersion pre-compensation from a range between a lower bound and an upper bound, wherein: the lower bound is greater than cumulative dispersion over the first portion (e.g., over sections $110_1$-$110_{32}$; FIGS. 1 and 2A); and the upper bound is smaller than total dispersion over the fiber-optic link (e.g., over sections $110_1$-$110_{36}$; FIGS. 1 and 2A).

In some embodiments of any of the above methods, if the fiber-optic link has said first and second portions, then the step of selecting comprises selecting the amount of dispersion pre-compensation such as to cause a transmitted optical signal to have a PAPR minimum inside the second portion.

In some embodiments of any of the above methods, the second portion comprises one or more dispersion-managed sections (e.g., $110_5$-$110_{28}$; FIGS. 1 and 3A).

In some embodiments of any of the above methods, at least one of the dispersion-managed sections comprises a span of dispersion compensating fiber.

In some embodiments of any of the above methods, the step of configuring comprises configuring a processor (e.g., 512; FIG. 5) in the optical transmitter to apply said amount of dispersion pre-compensation by performing electronic dispersion pre-compensation.

In some embodiments of any of the above methods, the step of configuring comprises configuring an optical dispersion pre-compensator (e.g., 540; FIG. 5) in the optical transmitter to apply said amount of dispersion pre-compensation by performing optical dispersion pre-compensation.

In some embodiments of any of the above methods, the step of configuring comprises: partitioning said amount of dispersion pre-compensation into a first sub-amount and a second sub-amount; configuring a processor (e.g., 512; FIG. 5) in the optical transmitter to apply the first sub-amount of dispersion pre-compensation by performing electronic dispersion pre-compensation; and configuring an optical dispersion pre-compensator (e.g., 540; FIG. 5) in the optical transmitter to apply the second sub-amount of dispersion pre-compensation by performing optical dispersion pre-compensation.

In some embodiments of any of the above methods, the step of selecting comprises reading said amount of dispersion pre-compensation from a look-up table having stored therein a plurality of pre-computed amounts of dispersion pre-compensation, each corresponding to a respective inhomogeneous link in a fiber-optic network configured to optically connect the optical transmitter and a plurality of optical receivers.

In some embodiments of any of the above methods, the step of selecting comprises receiving said amount of dispersion pre-compensation from a computation entity configured to compute said amount of dispersion pre-compensation based on one or more physical characteristics of the fiber-optic link.

According to another embodiment disclosed above in reference to FIGS. 1-5, provided is an apparatus (e.g., 100, FIG. 1) comprising: an optical transmitter (e.g., 500, FIG. 5) configured to be optically coupled to an inhomogeneous fiber-optic link (e.g., 104, FIG. 1); and a controller (e.g., 102; FIG. 1) configured to: select (e.g., using step 406; FIG. 4) an amount of dispersion pre-compensation based on dispersion characteristics of the inhomogeneous fiber-optic link; and cause the optical transmitter (e.g., using step 408; FIG. 4) to apply said amount of dispersion pre-compensation during an optical transmission over the inhomogeneous fiber-optic link.

In some embodiments of the above apparatus, the apparatus further comprises the inhomogeneous fiber-optic link, wherein the inhomogeneous fiber-optic link comprises (i) a first portion (e.g., $110_1$-$110_{n-k}$; FIG. 1) characterized by a first effective dispersion-coefficient value and (ii) a second portion (e.g., $110_{n-k+1}$-$110_n$; FIG. 1) characterized by a second effective dispersion-coefficient value that is smaller than the first effective dispersion-coefficient value, with the first portion being closer to the optical transmitter than the second portion (e.g., as in 202, FIG. 2A, or 302, FIG. 3A).

In some embodiments of any of the above apparatus, the second portion comprises one or more dispersion-managed sections (e.g., $110_5$-$110_{28}$; FIGS. 1 and 3A); and at least one of the dispersion-managed sections comprises a span of dispersion compensating fiber.

In some embodiments of any of the above apparatus, the first effective dispersion-coefficient value is greater than the second effective dispersion-coefficient value by a factor of at least 3.

In some embodiments of any of the above apparatus, the first effective dispersion-coefficient value is greater than the second effective dispersion-coefficient value by a factor of at least 10.

In some embodiments of any of the above apparatus, the optical transmitter comprises a processor (e.g., 512; FIG. 5) configured to apply said amount of dispersion pre-compensation by performing electronic dispersion pre-compensation.

In some embodiments of any of the above apparatus, the optical transmitter comprises an optical dispersion pre-compensator (e.g., 540; FIG. 5) configured to apply said amount of dispersion pre-compensation by performing optical dispersion pre-compensation.

In some embodiments of any of the above apparatus, the controller is configured to read said amount of dispersion pre-compensation from a look-up table having stored therein a plurality of pre-computed amounts of dispersion pre-compensation, each corresponding to a respective inhomogeneous link in a fiber-optic network configured to optically connect the optical transmitter and a plurality of optical receivers.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments indicated by the reference labels.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention(s). It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method of dispersion management, the method comprising:
   configuring a controller to determine, based on a location of an intended optical receiver, whether or not a fiber-optic link between an optical transmitter and the intended optical receiver is an inhomogeneous link, including determining whether or not the fiber-optic link has a first portion characterized by a first effective dispersion-coefficient value and a second portion characterized by a second effective dispersion-coefficient value that is smaller than the first effective dispersion-coefficient value by a factor of at least 1.5; and
   further configuring the controller to select, if the fiber-optic link is an inhomogeneous link, an amount of dispersion pre-compensation based on dispersion characteristics of the first portion and the second portion of the fiber-optic link; and
   configuring the optical transmitter to apply said amount of dispersion pre-compensation before an optical transmission to the intended optical receiver.

2. The method of claim 1, further comprising:
   if the fiber-optic link is not an inhomogeneous link, then configuring the optical transmitter to perform an optical transmission to the intended optical receiver without dispersion pre-compensation.

3. The method of claim 1, further comprising:
if the second portion is closer to the optical transmitter than the first portion, then configuring the optical transmitter to perform an optical transmission to the intended optical receiver without dispersion pre-compensation.

4. The method of claim 1, wherein the first effective dispersion-coefficient value is greater than the second effective dispersion-coefficient value by a factor of at least about 3.

5. The method of claim 1, wherein the first effective dispersion-coefficient value is greater than the second effective dispersion-coefficient value by a factor of at least about 10.

6. The method of claim 1, wherein the amount of dispersion pre-compensation is selected such as to approximately minimize an average PAPR in the second portion.

7. The method of claim 1, wherein an absolute value of the amount of dispersion pre-compensation is selected from a range between a lower bound and an upper bound, wherein:
the lower bound is greater than cumulative dispersion over the first portion; and
the upper bound is smaller than total dispersion over the fiber-optic link.

8. The method of claim 1, wherein the amount of dispersion pre-compensation is selected such as to cause a transmitted optical signal to have a PAPR minimum inside the second portion.

9. The method of claim 1, wherein the second portion comprises one or more dispersion-managed sections.

10. The method of claim 9, wherein at least one of the dispersion-managed sections comprises a span of dispersion compensating fiber.

11. The method of claim 1, wherein the step of configuring the optical transmitter comprises one or both of:
configuring a processor in the optical transmitter to apply at least a portion of said amount of dispersion pre-compensation by performing electronic dispersion pre-compensation; and
configuring an optical dispersion pre-compensator in the optical transmitter to apply at least a portion of said amount of dispersion pre-compensation by performing optical dispersion pre-compensation.

12. The method of claim 1, wherein the step of configuring the optical transmitter comprises:
partitioning said amount of dispersion pre-compensation into a first sub-amount and a second sub-amount;
configuring a processor in the optical transmitter to apply the first sub-amount of dispersion pre-compensation by performing electronic dispersion pre-compensation; and
configuring an optical dispersion pre-compensator in the optical transmitter to apply the second sub-amount of dispersion pre-compensation by performing optical dispersion pre-compensation.

13. The method of claim 1, wherein the step of further configuring the controller comprises configuring the controller to read said amount of dispersion pre-compensation from a look-up table having stored therein a plurality of pre-computed amounts of dispersion pre-compensation, each corresponding to a respective inhomogeneous link in a fiber-optic network configured to optically connect the optical transmitter and a plurality of optical receivers.

14. The method of claim 1, wherein the step of further configuring the controller comprises configuring the controller to receive said amount of dispersion pre-compensation from a computation entity configured to compute said amount of dispersion pre-compensation based on one or more physical characteristics of the fiber-optic link.

15. An apparatus comprising:
an optical transmitter configured to be optically coupled to an inhomogeneous fiber-optic link having a first portion characterized by a first effective dispersion-coefficient value and a second portion characterized by a second effective dispersion-coefficient value that is smaller than the first effective dispersion-coefficient value by a factor of at least 1.5; and
a controller configured to:
select an amount of dispersion pre-compensation based on dispersion characteristics of the first portion and the second portion of the inhomogeneous fiber-optic link; and
cause the optical transmitter to apply said amount of dispersion pre-compensation before an optical transmission over the inhomogeneous fiber-optic link.

16. The apparatus of claim 15,
wherein the second portion comprises one or more dispersion-managed sections; and
wherein at least one of the dispersion-managed sections comprises a span of dispersion compensating fiber.

17. The apparatus of claim 15, wherein the optical transmitter comprises a processor configured to apply said amount of dispersion pre-compensation by performing electronic dispersion pre-compensation.

18. The apparatus of claim 15, wherein the optical transmitter comprises an optical dispersion pre-compensator configured to apply said amount of dispersion pre-compensation by performing optical dispersion pre-compensation.

19. A method of configuring an optical transmitter, the method comprising:
based on a location of an intended optical receiver, determining whether or not a fiber-optic link between the optical transmitter and the intended optical receiver is an inhomogeneous link;
if the fiber-optic link is an inhomogeneous link, then:
selecting an amount of dispersion pre-compensation based on dispersion characteristics of the fiber-optic link; and
configuring the optical transmitter to apply said amount of dispersion pre-compensation before an optical transmission to the intended optical receiver; and
if the fiber-optic link is not an inhomogeneous link, then configuring the optical transmitter to perform an optical transmission to the intended optical receiver without dispersion pre-compensation.

20. A method of configuring an optical transmitter, the method comprising:
based on a location of an intended optical receiver, determining whether or not a fiber-optic link between the optical transmitter and the intended optical receiver is an inhomogeneous link;
if the fiber-optic link is an inhomogeneous link, then:
selecting an amount of dispersion pre-compensation based on dispersion characteristics of the fiber-optic link; and
configuring the optical transmitter to apply said amount of dispersion pre-compensation before an optical transmission to the intended optical receiver; and
wherein the step of configuring comprises:
partitioning said amount of dispersion pre-compensation into a first sub-amount and a second sub-amount;

configuring a processor in the optical transmitter to apply the first sub-amount of dispersion pre-compensation by performing electronic dispersion pre-compensation; and configuring an optical dispersion pre-compensator in the optical transmitter to apply the second sub-amount of dispersion pre-compensation by performing optical dispersion pre-compensation.

21. An apparatus comprising:

an optical transmitter configured to transmit an optical signal over a fiber-optic link; and a controller coupled to said optical transmitter and configured to select an amount of dispersion pre-compensation of said optical signal based on chromatic dispersion characteristics of a first portion of said fiber optic-link characterized by a first effective dispersion-coefficient value and a second portion of said fiber-optic link characterized by a second effective dispersion-coefficient value that is smaller than the first effective dispersion-coefficient value by a factor of at least 1.5.

22. The apparatus of claim 21, wherein the controller is further configured to cause the optical transmitter to apply said amount of dispersion pre-compensation before an optical transmission over the fiber-optic link.

23. The apparatus of claim 21, wherein the first effective dispersion-coefficient value is greater than the second effective dispersion-coefficient value by a factor of at least about 3.

24. The apparatus of claim 21, wherein the controller is configured to select an absolute value of the amount of dispersion pre-compensation from a range between a lower bound and an upper bound, wherein:

the lower bound is greater than cumulative dispersion over the first portion; and the upper bound is smaller than total dispersion over the fiber-optic link.

25. The apparatus of claim 21, wherein the controller is configured to select the amount of dispersion pre-compensation such as to cause the optical signal transmitted by the optical transmitter to have a PAPR minimum inside the second portion.

26. The apparatus of claim 21, wherein the controller is configured to:

cause an electronic processor in the optical transmitter to apply at least a portion of said amount of dispersion pre-compensation by performing electronic dispersion pre-compensation; and cause an optical dispersion pre-compensator in the optical transmitter to apply at least a portion of said amount of dispersion pre-compensation by performing optical dispersion pre-compensation.

27. The apparatus of claim 21, wherein the controller is configured to read said amount of dispersion pre-compensation from a look-up table having stored therein a plurality of pre-computed amounts of dispersion pre-compensation, each corresponding to a respective fiber-optic link in a fiber-optic network configured to optically connect the optical transmitter and a plurality of optical receivers.

28. The apparatus of claim 21, wherein the controller is configured to receive said amount of dispersion pre-compensation from a computation entity configured to compute said amount of dispersion pre-compensation based on one or more physical characteristics of the fiber-optic link.

* * * * *